(12) United States Patent
Horowitz et al.

(10) Patent No.: US 9,524,328 B2
(45) Date of Patent: Dec. 20, 2016

(54) RECOVERY SYNCHRONIZATION IN A DISTRIBUTED STORAGE SYSTEM

(71) Applicant: Strato Scale Ltd., Herzlia (IL)

(72) Inventors: Alon Horowitz, Netanya (IL); Rafael Buchbinder, Kiryat Ono (IL)

(73) Assignee: STRATO SCALE LTD., Herzlia (IL)

( * ) Notice: Subject to any disclaimer, the term of this patent is extended or adjusted under 35 U.S.C. 154(b) by 0 days.

(21) Appl. No.: 14/967,412

(22) Filed: Dec. 14, 2015

(65) Prior Publication Data

US 2016/0188691 A1 Jun. 30, 2016

Related U.S. Application Data

(63) Continuation of application No. PCT/IB2015/059510, filed on Dec. 10, 2015.

(60) Provisional application No. 62/097,077, filed on Dec. 28, 2014.

(51) Int. Cl.
*G06F 7/02* (2006.01)
*G06F 17/30* (2006.01)
*H04L 29/08* (2006.01)
*G06F 3/06* (2006.01)

(52) U.S. Cl.
CPC ......... *G06F 17/30581* (2013.01); *G06F 3/065* (2013.01); *G06F 17/30575* (2013.01); *H04L 67/1097* (2013.01)

(58) Field of Classification Search
None
See application file for complete search history.

(56) References Cited

U.S. PATENT DOCUMENTS

| | | |
|---|---|---|
| 6,148,377 A | 11/2000 | Carter et al. |
| 6,571,288 B1 | 5/2003 | Sarukkai |
| 6,591,355 B2 | 7/2003 | Schuster et al. |
| 6,823,429 B1 | 11/2004 | Olnowich |
| 7,162,476 B1 | 1/2007 | Belair et al. |
| 8,082,400 B1 | 12/2011 | Chang et al. |
| 8,266,238 B2 | 9/2012 | Zimmer et al. |
| 8,341,626 B1 | 12/2012 | Gardner et al. |
| 8,352,940 B2 | 1/2013 | Pafumi et al. |
| 8,370,302 B2 | 2/2013 | Otani |

(Continued)

FOREIGN PATENT DOCUMENTS

CA 2632935 A1 7/2007

OTHER PUBLICATIONS

Mitzenmacher et al., "The Power of Two Random Choices: Survey of Techniques and Results", Handbook of Randomized Computing, pp. 255-312, year 2000.

(Continued)

*Primary Examiner* — Bruce Moser
(74) *Attorney, Agent, or Firm* — D. Kligler IP Services Ltd.

(57) ABSTRACT

A method for data storage includes sending write commands to a first storage node, for storing data in a data volume on the first storage node. In response to a decision to create a copy of the data volume on a second storage node, (i) the write commands are sent both to the first storage node and to the second storage node, and (ii) a snapshot of the data volume is created and sent from the first storage node to the second storage node. The copy of the data volume is created by the second storage node based on the snapshot and on one or more of the write commands received at the second storage node.

5 Claims, 2 Drawing Sheets

(56) References Cited

U.S. PATENT DOCUMENTS

| | | |
|---|---|---|
| 8,544,004 B2 | 9/2013 | Fultheim et al. |
| 9,342,346 B2 | 5/2016 | Maislos et al. |
| 2004/0010487 A1 | 1/2004 | Prahlad et al. |
| 2007/0250838 A1 | 10/2007 | Belady et al. |
| 2008/0059556 A1 | 3/2008 | Greenspan et al. |
| 2009/0204718 A1 | 8/2009 | Lawton et al. |
| 2011/0072234 A1 | 3/2011 | Chinya et al. |
| 2011/0078112 A1 | 3/2011 | Takata et al. |
| 2011/0099318 A1 | 4/2011 | Hudzia et al. |
| 2011/0131568 A1 | 6/2011 | Heim |
| 2012/0005556 A1 | 1/2012 | Chang et al. |
| 2012/0011504 A1 | 1/2012 | Ahmad et al. |
| 2012/0284408 A1 | 11/2012 | Dutta et al. |
| 2013/0031559 A1 | 1/2013 | Alicherry |
| 2013/0086235 A1 | 4/2013 | Ferris |
| 2013/0249925 A1 | 9/2013 | Ginzburg |
| 2014/0196037 A1 | 7/2014 | Gopalan |
| 2014/0297979 A1* | 10/2014 | Baron ............... G06F 3/0647 711/162 |
| 2015/0234669 A1 | 8/2015 | Ben-Yehuda et al. |
| 2015/0286493 A1 | 10/2015 | Dafni et al. |
| 2015/0288758 A1 | 10/2015 | Ori |
| 2015/0312366 A1 | 10/2015 | Ben-Yehuda et al. |
| 2015/0378830 A1* | 12/2015 | Hoobler, III ........ G06F 11/1446 707/648 |
| 2016/0098302 A1 | 4/2016 | Ben-Yehuda et al. |

OTHER PUBLICATIONS

Hudzia et al., "Memory Aggregation for KVM", 41 pages, KVM forum, Nov. 2012.
VMware Virtualization, 8 pages, year 2014.
U.S. Appl. No. 14/341,813 Office Action dated Nov. 9, 2015.
International Application # PCT/IB2015/052178 dated Sep. 9, 2015.
International Application # PCT/IB2014/067329 Search Report dated Apr. 28, 2015.
Clark et al., "Live Migration of Virtual Machines", Proceedings of the 2nd conference on Symposium on Networked Systems Design & Implementation, vol. 2, USENIX Association, pp. 273-286, May 31, 2005.
Jo et al., "Efficient Live Migration of Virtual Machines Using Shared Storage", ACM Sigplan Notices, vol. 48, No. 7, pp. 41-50, Mar. 31, 2013.
International Application # PCT/IB2015/059510 Search Report dated Mar. 31, 2016.
Alicherry., "Network Aware Resource Allocation in Distributed Clouds", IEEE INFOCOM Proceedings, pp. 363-971, year 2012.
Viswanathan et al., "CloadMap: Workload-aware Placement in Private Heterogeneous Clouds", IEEE Network Operations and Management Symposium (NOMS), pp. 9-16, year 2012.
Berral et al., "Power-aware Multi-DataCenter Management using Machine Learning", 42nd International Conference om Parallel Processing, pp. 858-867, year 2013.
U.S. Appl. No. 14/675,844 Office Action dated Jun. 28, 2016.

* cited by examiner

RECOVERY SYNCHRONIZATION IN A DISTRIBUTED STORAGE SYSTEM

CROSS-REFERENCE TO RELATED APPLICATIONS

This application claims the benefit of U.S. Provisional Patent Application 62/097,077, filed Dec. 28, 2014. This application is a continuation of PCT Application PCT/IB2015/059510, filed Dec. 10, 2015. The disclosures of these related applications are incorporated herein by reference.

FIELD OF THE INVENTION

The present invention relates generally to data storage, and particularly to methods and systems for failure recovery in data storage systems.

BACKGROUND OF THE INVENTION

In many data storage schemes, the system maintains two or more copies of a data volume on different storage devices or compute nodes for resilience against failures. When a data volume is lost or corrupted due to failure, the system may create a new copy of the volume from an existing copy, to preserve the original level of redundancy.

SUMMARY OF THE INVENTION

An embodiment of the present invention that is described herein provides a method for data storage, including sending write commands to a first storage node, for storing data in a data volume on the first storage node. In response to a decision to create a copy of the data volume on a second storage node, (i) the write commands are sent both to the first storage node and to the second storage node, and (ii) a snapshot of the data volume is created and sent from the first storage node to the second storage node. The copy of the data volume is created by the second storage node based on the snapshot and on one or more of the write commands received at the second storage node.

In some embodiments, creating the snapshot includes including in the snapshot at least a write command having a specified serial number, and creating the copy of the data volume includes, in the second storage node, receiving the snapshot, and creating the copy of the data volume from the received snapshot and the received write commands whose serial numbers are larger than the specified serial number.

In an embodiment, the method includes sending from the second storage node to the first storage node a snapshot request that specifies the specified serial number, and discarding in the second storage node any received write commands whose serial numbers are smaller than or equal to the specified serial number. In another embodiment, the method includes detecting in the first storage node a write command that (i) is received after the snapshot has been created, and (ii) has a serial number larger than the specified serial number, and requesting the client node to re-issue the write command with a new serial number.

Typically, creating the copy of the data volume includes initializing the copy in the second storage node from the snapshot, and then executing the one or more received write commands in the initialized copy.

There is additionally provided, in accordance with an embodiment of the present invention, a computing system including a client node and at least a first storage node and a second storage node. The client node is configured to send write commands to the first storage node for storing data in a data volume on the first storage node. In response to a decision to create a copy of the data volume on the second storage node, the client node is configured to send the write commands both to the first storage node and to the second storage node, the first storage node is configured to create and send to the second storage node a snapshot of the data volume, and the second storage node is configured to create the copy of the data volume by the second storage node, based on the snapshot and on one or more of the write commands received at the second storage node.

There is also provided, in accordance with an embodiment of the present invention, a storage node including an interface and a processor. The interface is configured for communicating with a client node and with an additional storage node over a computer network. The processor is configured to receive from the client node write commands having respective serial numbers for storing data in a data volume, to receive from the additional storage node a request to create a snapshot of the data volume that includes at least a write command having a specified serial number, and to create and send the snapshot to the additional storage node.

There is further provided, in accordance with an embodiment of the present invention, a storage node including an interface and a processor. The interface is configured for communicating with a client node and with an additional storage node over a computer network. The processor is configured, in response to a decision to create on the storage node a copy of a data volume that is stored on the additional storage node, to start receiving write commands for storing data in the copy of the data volume, to request the additional storage node to create and send a snapshot of the data volume, and to create the copy of the data volume based on the snapshot and on one or more of the received write commands.

The present invention will be more fully understood from the following detailed description of the embodiments thereof, taken together with the drawings in which:

DETAILED DESCRIPTION OF EMBODIMENTS

Overview

Figure 1:
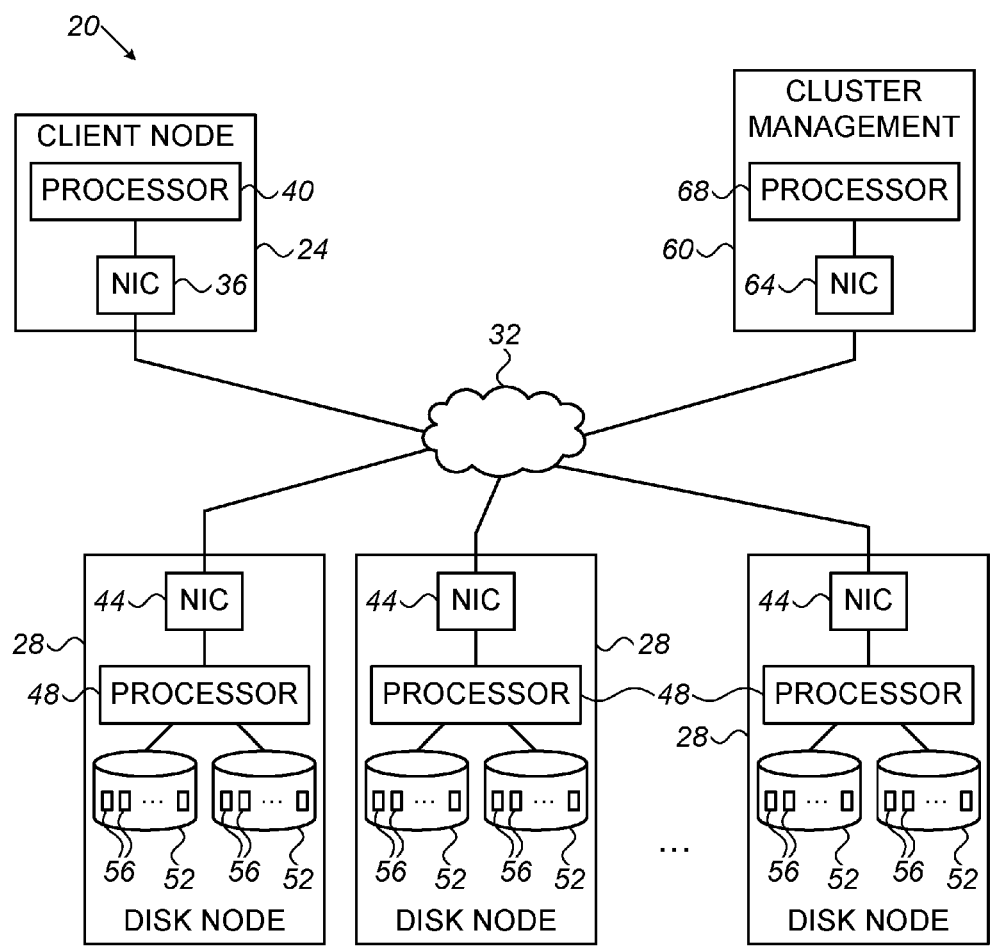
FIG. 1 is a block diagram that schematically illustrates a computing system, in accordance with an embodiment of the present invention.

Embodiments of the present invention that are described herein provide improved methods and systems for recovering data volumes. In some embodiments, a computing system comprises multiple compute nodes. At some point in time, a new copy of a data volume is to be created on a destination node, from an existing copy of the data volume that is stored on a source node. The source node continues to receive new write commands to the data volume from a client node during the recovery process.

In some disclosed embodiments, once a decision is made to create the new copy, the client node begins to send each write command both to the source node and to the destination node. The client node sends the write commands with respective serial numbers attached thereto. In addition, the destination node requests the source node to create and send a snapshot of the data volume. In the request, the destination node specifies a certain serial number X, and requests that the snapshot include the write commands up to and including this serial number.

Until receiving the snapshot from the source node, the destination node discards write commands arriving from the client node if their serial numbers are smaller than or equal to X, and accumulates the write commands having serial numbers larger than X. Upon receiving the snapshot from the source node, the destination node creates the new copy of the data volume from the snapshot (which spans the write commands up to serial number X) plus the locally-accumulated write commands (starting from serial number X+1).

The recovery process described above creates a new copy that is identical to the existing copy, provided that the write commands arrive in-order at the source node. If write commands possibly arrive out-of-order, it is possible that a write command with a serial number larger than X will arrive in the source node after the source node has already created the snapshot. Unless accounted for, such a write command will not be included in the new copy of the data volume, because (i) it is not included in the snapshot created by the source node, and (ii) it is discarded by the destination node.

In some embodiments, the system uses an additional mechanism referred to as "promotion" to account for possible out-of-order arrival of write commands. In these embodiments, after creating the snapshot, the source node checks each newly-arriving write command and verifies whether its serial number is indeed larger than X. Upon detecting a write command that arrived after the snapshot was created but has a serial number larger than X, the source node sends the write command back to the client node and requests the client node to re-issue the write command with a new serial number. The newly-issued ("promoted") write command is sent to the destination node and is added to the new copy.

In summary, the methods and systems described herein a new copy on-the-fly, i.e., without having to stop receiving write commands to the data volume. Moreover, the disclosed techniques do not assume that write commands arrive in-order.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable type of computing system.

System 20 comprises multiple compute nodes of various kinds, referred to simply as "nodes" for brevity. In the example of FIG. 1, the system comprises one or more client nodes 24 and multiple disk nodes 28, also referred to as storage nodes. FIG. 1 shows a single client node and three disk nodes for the sake of clarity. Real-life implementations of system 20, however, may comprise large numbers of client nodes and disk nodes. In some embodiments, a given compute node (or even all compute nodes) may serve as both a client node and a disk node. Client nodes 24 and disk nodes 28 communicate with one another over a computer network 32, e.g., a Local Area Network (LAN).

Each client node 24 typically runs client applications that, among other tasks, send data for persistent storage and retrieve data from persistent storage. In the present example, client node 24 comprises a network interface, such as a Network Interface Controller (NIC) 36, for communicating over network 32, and a processor 40 for running the client applications and carrying out various other processing tasks of the client node.

Each disk node 28 comprises one or more storage devices 52, e.g., Solid State Drives (SSDs) or Hard Disk Drives (HDDs), for storing data generated by client nodes 24. In the present example, disk node 28 comprises a network interface, such as a NIC 44, for communicating over network 32, and a processor 48 for managing the storage of data in storage devices 52 and carrying out various other processing tasks of the disk node. Typically, the applications running on client nodes store data in data volumes 56 that are stored on storage devices 52 of disk nodes 28. Each client node 24 typically stores data by sending write commands. Each write command specifies the data, and the data volume in which the data is to be stored.

In some embodiments, each data volume is replicated across multiple disk nodes 28 for redundancy. In other words, system 20 typically stores two or more copies of each data volume on different disk nodes. When a copy is lost or corrupted, e.g., due to failure of a disk node or a storage device, the system uses an existing copy to create another copy of the data volume on a functional disk node, so as to preserve the expected level of redundancy.

In the example of FIG. 1, system 20 comprises a cluster management unit 60, which manages the cluster-wide data storage functions. Unit 60 comprises an interface, e.g., a NIC 64, for communicating with the client nodes and disk nodes over network 32, and a processor 68 for carrying out the various management tasks. Among other tasks, processor 68 decides when to create a new copy of a data volume, and on which disk node and from which existing copy to create the new copy. Processor 68 instructs the various client nodes and disk nodes accordingly. In alternative embodiments, however, such management functions may be carried out by any other suitable entity. Distributed management, in which the functions of unit 60 are distributed among processors 40 of the client nodes and/or processors 48 of the disk nodes, is also possible.

The system, client-node, disk-node and cluster-management-unit configurations shown in FIG. 1 are example configurations that are chosen purely for the sake of conceptual clarity. In alternative embodiments, any other suitable configurations can be used. The various elements of system 20 may be implemented using hardware/firmware, such as in one or more Application-Specific Integrated Circuit (ASICs) or Field-Programmable Gate Array (FPGAs). Alternatively, some system elements may be implemented in software or using a combination of hardware/firmware and software elements.

Typically, processors 40, 48 and 68 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Synchronized on-the-Fly Recovery of Data Volumes

Figure 2:
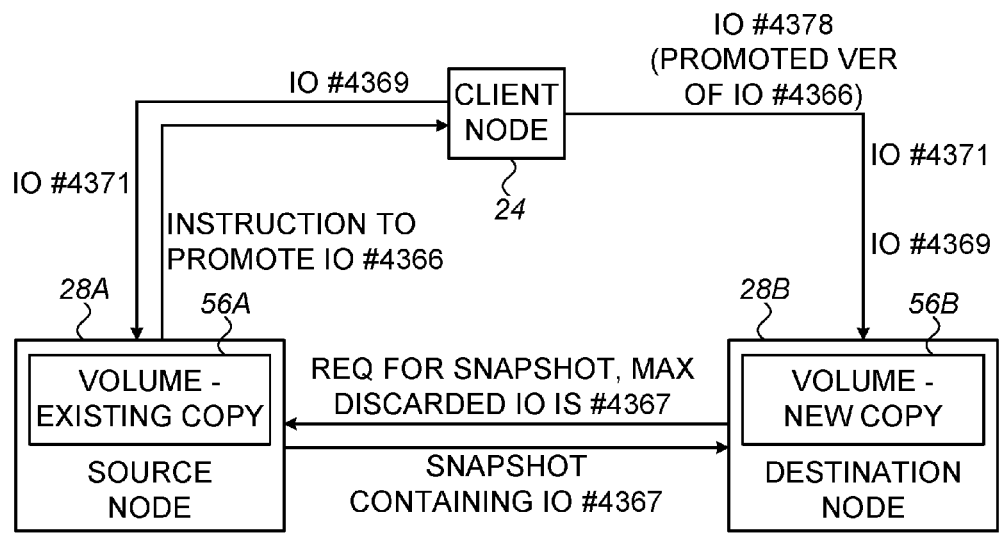
FIG. 2 is a diagram that schematically illustrates synchronized recovery of a data volume, in accordance with an embodiment of the present invention.

FIG. 2 is a diagram that schematically illustrates synchronized recovery of a data volume, in accordance with an embodiment of the present invention. The figure shoes three nodes of system 20—Client node 24, a source node 28A (one of disk nodes 28) on which an existing copy 56A of the data volume is stored, and a destination node 28B (another one of disk nodes 28) on which a new copy 56B of the data volume is to be created.

In some embodiments, once a decision is made (e.g., by management unit 60) to create new copy 56B, client node 24 is instructed to send each write command addressed to the data volume both to source node 28A and to destination node 28B. Client node 24 assigns respective serial numbers to the write commands, and marks each write command with the appropriate serial number.

The figure shows two example write commands (also referred to as Input-Output (IO) commands) having serial numbers #4369 and #4371 that are sent from client node 24 in parallel to source node 28A and to destination node 28B.

In addition, in response to the decision to create the new copy, destination node 28B requests source node 28A to create and send a snapshot of the data volume. In the request, destination node 28B specifies a certain serial number X, and requests that the snapshot include the write commands up to and including this serial number. In the present example, the specified serial number X is #4367.

Until receiving the snapshot from source node 28A, destination node 28B discards write commands arriving from client node 24 if their serial numbers are smaller than or equal to X, and accumulates the write commands having serial numbers larger than X. Upon receiving the snapshot from source node 28A, destination node 28B creates new copy 56B of the data volume from the snapshot, and from the locally-accumulated write commands.

As long as the write commands arrive in-order, the snapshot includes the write commands up to serial number X, and the write commands accumulated by destination node 28B start from serial number X+1. Thus, destination node 28B has the complete information for constructing new copy 56B that is identical to existing copy 56A, even though write commands continue to arrive and modify the data volume.

If, on the other hand, write commands arrive out-of-order, it is possible that a write command with a serial number larger than X will arrive in source node 28A after the source node has already created the snapshot. Such a write command may not be included in new copy 56B, because (i) it is not included in the snapshot, and (ii) it is discarded by destination node 28B.

In some embodiments, system 20 overcomes this issue using an additional mechanism referred to as "promotion" of write commands. In an embodiment, after creating the snapshot, source node 28A checks each newly-arriving write command and verifies whether its serial number is larger than X or not.

Upon detecting a write command that arrived after the snapshot was created but has a serial number larger than X, source node 28A does not acknowledge the write command. The source node sends the write command back to the client node 24, and requests client node 24 to re-issue the write command with a new serial number. In response, client node 24 issues the write command again with a new serial number. The newly-issued ("promoted") write command is sent to the destination node. Since the new serial number is larger than X, the newly-issued write command is added to the new copy.

In the example of FIG. 2, a write command with IO #4366 arrives at source node 28A after the snapshot has been created (recall that X=#4367). The source node instructs client node 24A to promote this write command. In response, client 24A re-issues the write command with serial number #4378. Since the new serial number is larger than X, destination node 28B adds the newly-issued write command to new copy 56B.

Thus, the promotion mechanism described above guarantees that new copy 56B is kept identical to existing copy 56A, notwithstanding the out-of-order arrival of write commands.

Figure 3:
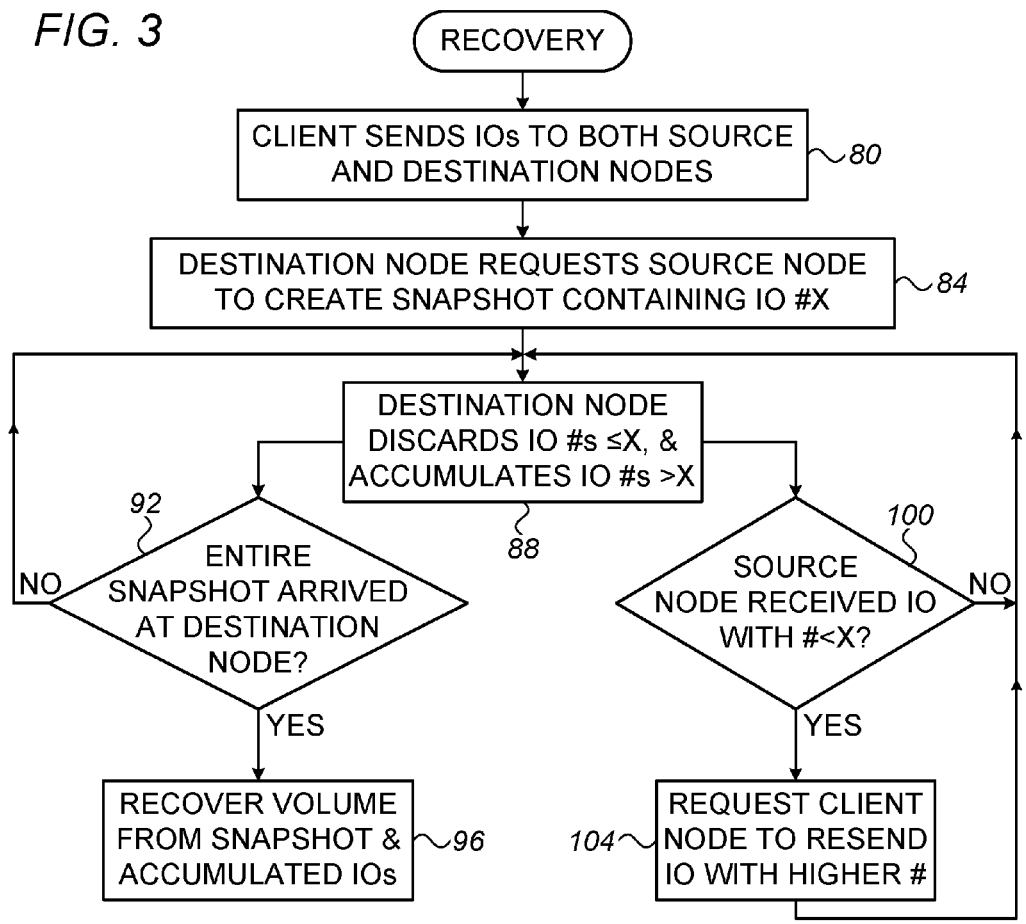
FIG. 3 is a flow chart that schematically illustrates a method for synchronized recovery of a data volume, in accordance with an embodiment of the present invention.

FIG. 3 is a flow chart that schematically illustrates a method for synchronized recovery of a data volume, in accordance with an embodiment of the present invention. The recovery method begins with the client node sending IO commands to both the source node and the destination node, at a duplicate sending step 80.

At a snapshot requesting step 84, the destination node requests the source node to create and send a snapshot of the data volume that contains IO #X. The source node creates the snapshot and begins to send it to the destination node. At a selective accumulation step 88, the destination node discards write commands whose serial number ≤X, and accumulates write commands whose serial number >X.

At a snapshot checking step 92, the destination node checks whether the entire snapshot has arrived from the source node. If not, the method loops back to step 88 above. Once the entire snapshot arrives, the destination node creates the new copy of the data volume based on the snapshot and based on the accumulated write commands, at a copy creation step 96. The destination node typically initializes the new copy from the snapshot, and then executes the accumulated write commands in the initialized copy.

In parallel, at a promotion checking step 100, the source node checks whether a write command having a serial number <X is received after the snapshot has been created. If not, the method loops back to step 88 above. Upon detecting a write command whose serial number is smaller than X, the source node requests the client node to "promote" the write command, i.e., re-issue the write command with a new serial number, at a promotion requesting step 104.

The process described in FIGS. 2 and 3 is depicted by way of example. In alternative embodiments, other suitable recovery processes can be used. For example, if it can be guaranteed that write commands arrive in-order, the "promotion" mechanism can be omitted.

Although the embodiments described herein mainly address recovery of data volumes, the methods and systems described herein can also be used in other suitable storage applications such as object stores and distributed file-systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:

sending write commands to a first storage node, for storing data in a data volume on the first storage node;

in response to a decision to create a copy of the data volume on a second storage node, (i) sending the write commands both to the first storage node and to the second storage node, and (ii) creating and sending from the first storage node to the second storage node a snapshot of the data volume, wherein the snapshot includes at least a write command having a specified serial number;

creating the copy of the data volume by the second storage node, by receiving the snapshot and creating the copy of the data volume from the received snapshot and the write commands that are received at the second storage node and whose serial numbers are larger than the specified serial number; and sending from the second storage node to the first storage node a snapshot request that specifies the specified serial number, and discarding in the second storage node any received write commands whose serial numbers are smaller than or equal to the specified serial number.

2. A method for data storage, comprising:

sending write commands to a first storage node, for storing data in a data volume on the first storage node;

in response to a decision to create a copy of the data volume on a second storage node, (i) sending the write commands both to the first storage node and to the second storage node, and (ii) creating and sending from the first storage node to the second storage node a snapshot of the data volume, wherein the snapshot includes at least a write command having a specified serial number;

creating the copy of the data volume by the second storage node, by receiving the snapshot and creating the copy of the data volume from the received snapshot and the write commands that are received at the second storage node and whose serial numbers are larger than the specified serial number; and detecting in the first storage node a write command that (i) is received after the snapshot has been created, and (ii) has a serial number smaller than the specified serial number, and requesting the client node to re-issue the write command with a new serial number.

3. A computing system, comprising:

a client node; and at least a first storage node and a second storage node, wherein the client node is configured to send write commands to the first storage node for storing data in a data volume on the first storage node, and wherein, in response to a decision to create a copy of the data volume on the second storage node, the client node is configured to send the write commands both to the first storage node and to the second storage node, the first storage node is configured to create and send to the second storage node a snapshot of the data volume, and the second storage node is configured to create the copy of the data volume by the second storage node, based on the snapshot and on one or more of the write commands received at the second storage node, wherein the first storage node is configured to include in the snapshot at least a write command having a specified serial number, wherein the second storage node is configured to receive the snapshot and create the copy of the data volume from the received snapshot and the received write commands whose serial numbers are larger than the specified serial number, and wherein the second storage node is configured to send to the first storage node a snapshot request that specifies the specified serial number, and to discard any received write commands whose serial numbers are smaller than or equal to the specified serial number.

4. A computing system, comprising:

a client node; and at least a first storage node and a second storage node, wherein the client node is configured to send write commands to the first storage node for storing data in a data volume on the first storage node, and wherein, in response to a decision to create a copy of the data volume on the second storage node, the client node is configured to send the write commands both to the first storage node and to the second storage node, the first storage node is configured to create and send to the second storage node a snapshot of the data volume, and the second storage node is configured to create the copy of the data volume by the second storage node, based on the snapshot and on one or more of the write commands received at the second storage node, wherein the first storage node is configured to include in the snapshot at least a write command having a specified serial number, wherein the second storage node is configured to receive the snapshot and create the copy of the data volume from the received snapshot and the received write commands whose serial numbers are larger than the specified serial number, and wherein the first storage node is configured to detect a write command that (i) is received after the snapshot has been created, and (ii) has a serial number smaller than the specified serial number, and to request the client node to re-issue the write command with a new serial number.

5. A storage node, comprising:

an interface for communicating with a client node and with an additional storage node over a computer network; and a processor, which is configured to receive from the client node write commands having respective serial numbers for storing data in a data volume, to receive from the additional storage node a request to create a snapshot of the data volume that includes at least a write command having a specified serial number, and to create and send the snapshot to the additional storage node, wherein the processor is configured to detect a write command that (i) is received after the snapshot has been created, and (ii) has a serial number larger than the specified serial number, and to request the client node to re-issue the write command with a new serial number.

* * * * *